United States Patent [19]
McKittrick

[11] Patent Number: 5,813,206
[45] Date of Patent: Sep. 29, 1998

[54] GARDEN TOOL HAVING ENHANCED LEVERAGE

[76] Inventor: Janie McKittrick, 4901 Frontenac Ave., Golden Valley, Minn. 55422

[21] Appl. No.: 614,158

[22] Filed: Mar. 8, 1996

[51] Int. Cl.⁶ .............................. A01D 7/00; A01B 1/00
[52] U.S. Cl. .................................. 56/400.01; 56/400.17; 294/58; 172/371
[58] Field of Search ........................ 294/58; 56/400.01, 56/400.17, 400.21, 400.04; 172/378, 371; D8/1

[56] References Cited

U.S. PATENT DOCUMENTS

| D. 352,872 | 11/1994 | Crockett | D8/1 |
|---|---|---|---|
| 712,843 | 11/1902 | Paul . | |
| 2,482,589 | 9/1949 | Maguire | 294/58 |
| 2,710,571 | 6/1955 | Pfister . | |
| 3,232,355 | 2/1966 | Woolworth . | |
| 4,644,740 | 2/1987 | Lee . | |
| 4,822,087 | 4/1989 | DeCario . | |
| 4,888,846 | 12/1989 | Natale . | |
| 5,014,792 | 5/1991 | Gierloff . | |
| 5,133,101 | 7/1992 | Hauser et al. | 294/58 |
| 5,177,941 | 1/1993 | Tharp et al. . | |
| 5,529,357 | 6/1996 | Hoffman | 294/58 |

FOREIGN PATENT DOCUMENTS

| 1149887 | 4/1985 | U.S.S.R. | 294/58 |
|---|---|---|---|
| 135100 | 11/1919 | United Kingdom | 294/58 |
| 2248034 | 3/1992 | United Kingdom . | |
| 2278798 | 12/1994 | United Kingdom . | |

*Primary Examiner*—Heather Shackelford
*Attorney, Agent, or Firm*—Dorsey & Whitney LLP

[57] ABSTRACT

A hand held garden rake configured to enhance downward force for digging and raking. The rake has a rod frame which extends from tines located at the front end of the rake to a brace located at the rear of the rake. The frame is bent to extend back towards the front end of the rake, at which point the frame terminates in an upwardly extending handle. The brace rests on the forearm, so that additional force is developed when the tines of the rake are urged downwardly into the ground. The vertical orientation of the handle is more natural and comfortable than would be a horizontal orientation. The handle is provided with a molded grip for cooperating with a user's hand. The brace has a resilient cushion for comfort when pressing downwardly on the tines.

4 Claims, 2 Drawing Sheets

GARDEN TOOL HAVING ENHANCED LEVERAGE

BACKGROUND OF THE INVENTION

1. Field of the Invention

The present invention relates to a garden tool having tines and a handle. More specifically, the novel tool further comprises a handle disposed normally to the longitudinal dimension of the tool and oriented upwardly, and an arm brace for engaging the forearm. The arm brace enhances leverage or force which may be applied to force the tines downwardly into the soil. Upward orientation of the handle provides more comfortable grasp, which further enhances the force which may be developed by the hand and arm combined.

2. Description of the Prior Art

Garden rakes, particularly small rakes held in one hand, are employed by gardeners for both raking and digging purposes. This type of tool is quite useful in clearing dead plant growth from the surface of the soil, for separating roots from soil, and for digging shallow holes and trenches for planting.

From time to time, resistance encountered while performing these tasks varies considerably, possibly requiring force beyond that which may be developed while grasping the handle of the tool. The prior art has suggested numerous arm braces which may be exploited for enhancing force applied to the blade, tines, or other working element of the tool.

U.S. Pat. No. 2,710,571, issued to Frederick W. Pfister on Jun. 14, 1955 illustrates a tined garden rake having a handle and an arm brace. Unlike the tool of Pfister, the handle of the present invention is vertically oriented when the tines face the ground. This orientation of the handle affords grip which is slightly more natural, comfortable, and therefore fatigue resistant than the horizontal orientation of Pfister's handle. Greater force can be developed and applied by a user in the present invention than occurs with Pfister's arrangement.

U.S. Pat. No. 712,843, issued to Ralph H. Paul on Nov. 4, 1902 describes an arm brace in combination with a vertical handle. However, the working element of the tool is aligned with the longitudinal dimension of the tool. This orientation is suitable for forward movement of the tool. However, unlike the present invention, this arrangement does not enable downward force to be applied to the working element when the longitudinal dimension of the tool is horizontal, or parallel to the ground. Also, the brace requires fastening of a strap for effectiveness. By contrast, in the instant invention, the working element is perpendicular to the longitudinal dimension and oriented opposite the handle with respect to the longitudinal dimension. The brace lacks a strap, having instead a cushioned bar. Paul's device has a scraping blade, which is unlike the tines of the present invention in structure and purpose.

A similar device is shown in U.S. Pat. No. 4,888,846, issued to Thomas Natale on Dec. 26, 1989. Natale has a working element disposed in alignment with the longitudinal dimension of his tool. Unlike the present invention, this arrangement does not enable downward force to be applied to the working element when the longitudinal dimension of the tool is horizontal, or parallel to the ground. Natale's device has a scraping blade, which is unlike the tines of the present invention in structure and purpose.

U.S. Pat. No. 4,822,087, issued to Tony J. DeCarlo on Apr. 18, 1989, features a tool having a vertical handle and an arm brace. However, the arm brace is disposed to be ineffective if DeCarlo's tool were forced into the ground at its working element. This arrangement is opposite that of the present invention. Also, DeCarlo's working element is flaccid, unlike that of the present invention. Therefore, the purpose of the present invention cannot be realized by DeCarlo's invention. DeCarlo's working element has no relation to piercing the ground or to raking action, unlike the present invention.

None of the above inventions and patents, taken either singly or in combination, is seen to describe the instant invention as claimed.

SUMMARY OF THE INVENTION

The present invention provides an inexpensively fabricated tool well suited for development and application of downward force for a rake, scoop, or hand shovel. In an advancement of the prior art, the handle is advantageously oriented for development and application of downward force by one hand and arm, when compared to the horizontal orientation of the Pfister device. The handle is turned vertically upwardly with respect to the longitudinal dimension of the tool. This results in a more natural and comfortable position of the hand, wrist, and arm. More force is developed, and can be maintained for longer periods of time.

Apart from the working element, which is preferably a plurality of tines, but which may also be a flat blade or otherwise configured, the principal component of the tool is formed from rod stock. This rod stock is appropriately bent, and provided with a cushioned brace for engaging the forearm of the user and a handle for grasping by hand.

When fabricating the tool, no one bend need be greater than ninety degrees. Therefore, less complicated jigs may be employed than would be the case if Pfister's tool were similarly formed.

Pfister's tool has the characteristic that the handle is disposed between the working element and the brace. This arrangement is suitable for a horizontal handle. However, complications in fabrication occur if the handle is to be vertical. For example, either the handle must be welded or otherwise connected to a longitudinal member of the tool, or, if fabricated from a single piece of rod stock, must be bent double in order to form a vertical handle.

Accordingly, it is a principal object of the invention to provide a hand held gardening tool having a handle and a working element for piercing the ground, which tool enhances downward force developed and applied by the user.

It is another object of the invention to orient the handle vertically, for more natural and comfortable grasp of the handle when the user's arm is near and parallel to the ground.

It is a further object of the invention to provide a brace for engaging the arm and enhancing force applied to the tool by only one arm.

Still another object of the invention is to enable the tool to be fabricated by bending rod stock material.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
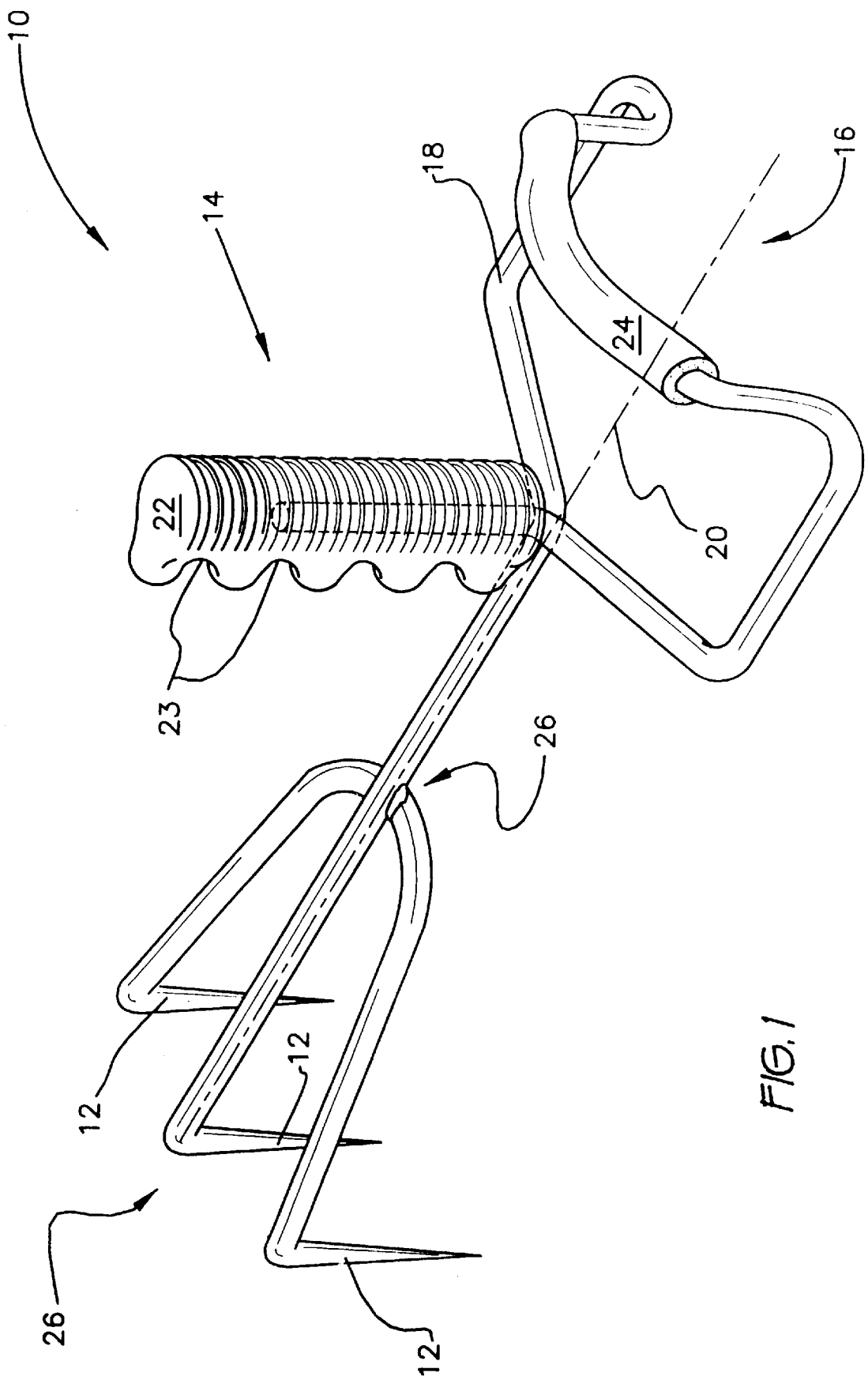
FIG. 1 is a perspective view of the invention.

Turning now to FIG. 1 of the drawings, the novel garden implement 10 is a hand held rake having tines 12, a handle 14, and a brace 16. The principal component of garden implement 10 is a frame member 18 which defines a longitudinal dimension or axis indicated at 20. Tines 12 are attached to frame member 18 at the proximal end of frame member 18, and brace 16 is attached to frame member 18 at the distal end thereof.

It should be noted that in other embodiments (not shown), garden implement 10 may comprise a small spade or still another tool. These embodiments would result were a working element other than the plurality of tines 12 provided. For example, the working element could be a shovel or spade blade (neither shown). Regardless of the specific embodiment of the working element, the working element projects downwardly towards the soil and vertically from frame member 18.

Handle 14 attaches to frame member 18 intermediate the working element, in the embodiment the working element depicted being tines 12, and brace 16. Handle 14 projects upwardly and vertically from frame member 18. A molded grip 22 configured to conform to the human hand is provided on handle 14 for enhanced grasp. Grip 22 increases the diameter of frame member 18, and further includes depressions 23 for receiving the user's fingers (not shown). Optionally, grip 22 may be resilient.

Brace 16 is similarly improved by incorporating a cushion 24. Cushion 24 is elastic or resilient, and deforms when pressing against the arm (not shown) of the user responsive to the user exerting increasing force on the working element of garden implement 10. This deformation distributes force developed by the hand and arm of the user over an increased area of the forearm of the user.

It is contemplated that an advantageous method of fabrication is achieved by bending rod stock to form frame member 18. Rod stock is a homogeneous, unitary member which may be subjected to bending to achieve a required shape. Other fabrication techniques, such as welding, brazing, friction fitting, for adding components other than the working element are not required.

In the preferred embodiment, wherein the working element comprises three tines 12, frame member 18 may itself form one tine 12 at its proximal end 26. If the working element is otherwise arranged, a separate working element (not shown) may be suitably joined to frame member 18, as by welding or forging. Regardless of the embodiment and method of fabrication, garden implement 10 is arranged in sequential fashion along frame member 18. This signifies that after bending, frame member 18 connects tines 12 to handle 14, then sequentially to brace 16. There is no branching of frame member 18 required to provide and connect the working element, handle 14, and brace 16.

Right and left side tines 12 may be formed from a shorter section of rod stock, appropriately bent and shaped, and welded at a point generally designated 28. Alternatively, tines 12 may be provided as a separate assembly (not shown) which is subsequently joined to frame member 18.

Figure 2:
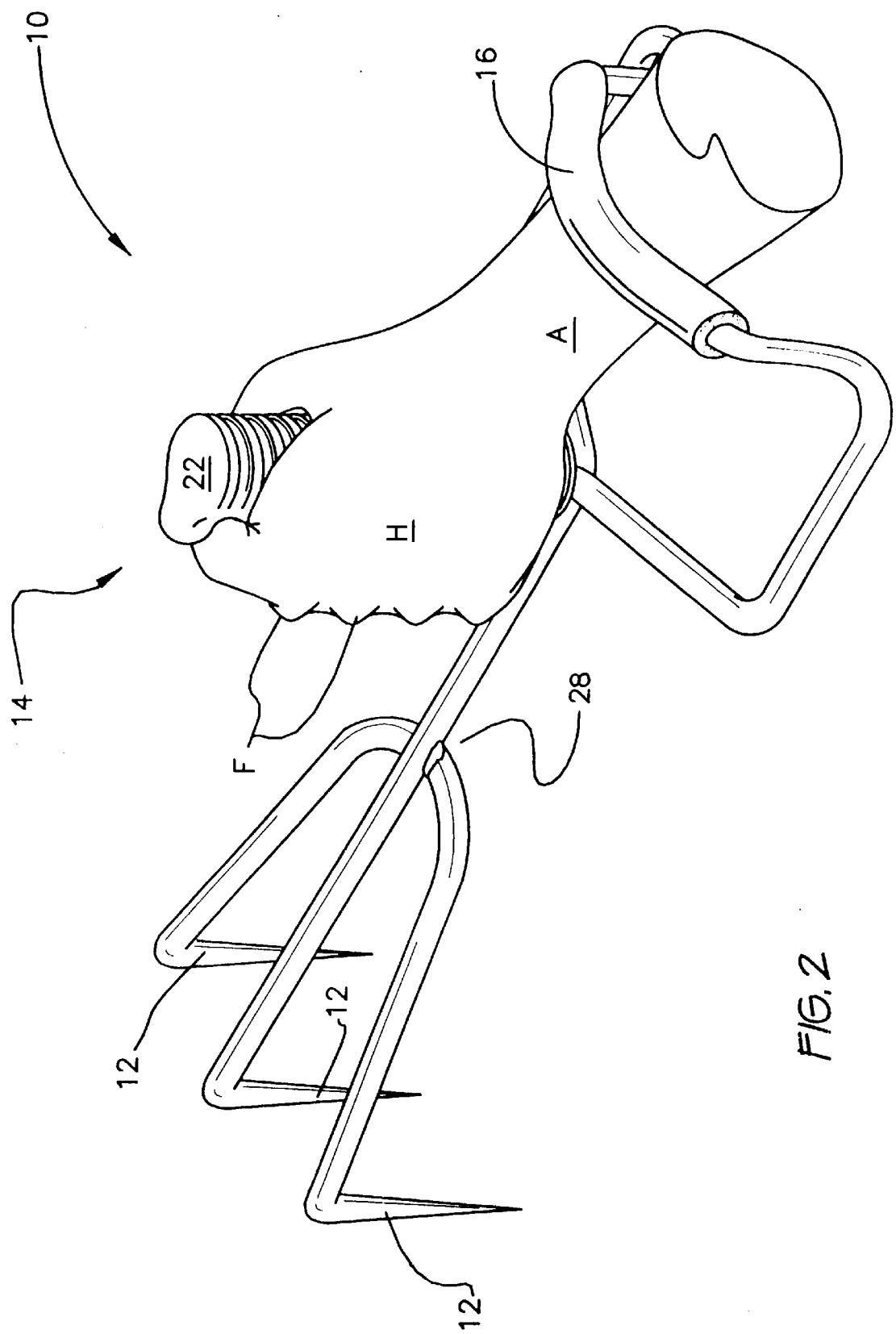
FIG. 2 is an environmental, perspective view of the invention.

The improved garden implement 10 is employed by grasping in the manner illustrated in FIG. 2. With the forearm A of the user passing beneath brace 16, the user's hand H grasps handle 14 with the fingers F encircling grip 22. The user then exerts downward force at handle 14 while either maintaining forearm A at a constant position above the ground or applying upward force at brace 16. Leverage developed by this manner of operation assists in urging tines 12 into the ground.

It will be obvious to those of skill in the art that still other fabrication techniques and arrangements may be employed without departing from the inventive concept.

It is to be understood that the present invention is not limited to the embodiments described above, but encompasses any and all embodiments within the scope of the following claims.

I claim:

1. A hand held gardening implement, comprising
   a frame member having a longitudinal dimension, a proximal end, and a distal end;
   a working element attached to said frame member at said proximal end of said frame member;
   a brace attached to said frame member at said distal end of said frame member; and
   a handle attached to said frame member intermediate said working element and said brace, said handle projecting away from said frame member and generally transversely with respect to said longitudinal dimension of said frame member, said frame member comprising rod stock bent to form said working element, said brace, and said handle in sequential fashion from a unitary component.

2. The gardening implement of claim 1, wherein said handle projects away from the frame member, generally perpendicularly with respect to the longitudinal dimension of the frame member.

3. A hand held gardening implement, comprising:
   a frame member having a longitudinal dimension, a proximal end, and a distal end;
   a plurality of tines attached to a working element on said frame member at said proximal end of said frame member, said plurality of tines projecting generally perpendicularly to the longitudinal dimension of said frame member;
   a brace attached to said frame member at said distal end of said frame member, said brace further comprising an elastic cushion for deforming to distribute force developed by the hand and arm of the user over an increased area of the forearm of the user; and
   a handle attached to said frame member intermediate said working element and said brace, said handle projecting away from said frame member generally transversely with respect to the longitudinal dimension of said frame member, said handle further comprising a molded grip for conforming to the configuration of the human hand, said frame member comprising rod stock bent to form said working element, said brace, and said handle from a unitary, homogeneous component.

4. The gardening implement of claim 3, wherein said handle projects away from the frame member generally perpendicularly with respect to the longitudinal dimension of the frame member.

* * * * *